US012339697B2

(12) United States Patent
Hennebert et al.

(10) Patent No.: US 12,339,697 B2
(45) Date of Patent: Jun. 24, 2025

(54) METHOD FOR GENERATING AN EVIDENCE OF THE TIME ELAPSED BETWEEN EVENTS IN AN ASYNCHRONOUS NODE NETWORK

(71) Applicant: COMMISSARIAT À L'ÉNERGIE ATOMIQUE ET AUX ÉNERGIES ALTERNATIVES, Paris (FR)

(72) Inventors: Christine Hennebert, Grenoble (FR); Dylan Paulin, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 169 days.

(21) Appl. No.: 18/363,422

(22) Filed: Aug. 1, 2023

(65) Prior Publication Data
US 2024/0045466 A1    Feb. 8, 2024

(30) Foreign Application Priority Data
Aug. 5, 2022    (FR) ........................................ 2208140

(51) Int. Cl.
*G06F 1/04*    (2006.01)
*G06F 1/06*    (2006.01)
(Continued)

(52) U.S. Cl.
CPC .............. *G06F 1/06* (2013.01); *H04L 63/123* (2013.01); *G06F 1/3203* (2013.01)

(58) Field of Classification Search
CPC ......... G06F 1/06; G06F 21/06; H04L 63/123; H04L 9/0877; H04L 9/0897; H04L 9/3297; H04L 2209/56; H04L 9/50
(Continued)

(56) References Cited

U.S. PATENT DOCUMENTS 10,592,662 B1 *    3/2020    Sobel ....................... G09C 1/00
2006/0107042 A1 *    5/2006    Kohmoto ................ G06F 21/10
713/158

(Continued)

OTHER PUBLICATIONS

Boneh, Dan, et al. "Verifiable Delay Functions", International Association for Cryptologic Research, 2018, pp. 757-788.
(Continued)

*Primary Examiner* — Volvick Derose
(74) *Attorney, Agent, or Firm* — McDonald Hopkins LLC

(57) ABSTRACT

A method for generating an evidence of the time elapsed between two successive events occurring within a node of an asynchronous network, for example between two transactions emitted by such a node intended to a distributed register (ledger). The node is provided with an embedded system comprising a TPM module generating a control clock, a system clock within a TEE environment and a precision clock. The node verifies the coherence of the clocks by comparing the measurements of the time elapsed between two successive transactions, the measurements having been performed by means of the different clocks. In case of coherence of the measurements, the node emits a transaction proving the elapsed time intended to the distributed register. A verifier node may verify this evidence and certifies that the evidence is verified by emitting a validation transaction to the distributed register.

15 Claims, 6 Drawing Sheets

(51) Int. Cl.
*H04L 9/40*        (2022.01)
*G06F 1/3203*      (2019.01)

(58) Field of Classification Search
USPC .......................................................... 713/600
See application file for complete search history.

(56) References Cited

U.S. PATENT DOCUMENTS

2019/0220603 A1* 7/2019 Gopalakrishnan ...... G06F 21/64
2020/0322075 A1* 10/2020 Bhandari ............... H04J 3/0688
2021/0176058 A1* 6/2021 Cheng ..................... G06F 16/27
2021/0314143 A1  10/2021 Conner et al.
2021/0357526 A1* 11/2021 Yekhanin ............ G06F 21/6254
2022/0158855 A1* 5/2022 Wentz ................... H04L 9/3247
2022/0414212 A1* 12/2022 Hopkins ................. G06F 21/75

OTHER PUBLICATIONS

Bowman, Mic, et al. "On Elapsed Time Consensus Protocols", International Association for Cryptologic Research, Jan. 23, 2021, pp. 1-47.
Search Report for French application No. FR2208140 dated Mar. 7, 2023.

* cited by examiner

METHOD FOR GENERATING AN EVIDENCE OF THE TIME ELAPSED BETWEEN EVENTS IN AN ASYNCHRONOUS NODE NETWORK

CROSS-REFERENCE TO RELATED APPLICATIONS

This application claims priority from French Patent Application No. 2208140 filed on Aug. 5, 2022. The content of this application is incorporated herein by reference in its entirety.

TECHNICAL FIELD

The present invention generally relates to methods for generating an evidence of the time elapsed between two events in an asynchronous network. In particular, it finds application in a consensus mechanism relating to an history of transactions on a distributed register (ledger).

PRIOR ART

Many consensus mechanisms have been suggested to validate transactions before incorporating them in a distributed register (ledger), the most known ones being the proof of work or PoW and the proof of stake or PoS. In general, these mechanisms address several objectives: that of verifying the integrity of the transactions, i.e. that these are neither falsified nor corrupted, that of authenticating the entities having emitted these transactions, and finally that of guaranteeing the correctness of the history of these transactions. Indeed, the modification of the history of different transactions might lead to very detrimental situations: double expense, debiting a cryptocurrency account in the absence of enough credit, infringement of a condition of execution of a smart contract. The proof of work allows guaranteeing in a verifiable manner (but at the expense of some latency) a correct history of the transactions but requires a considerable energy consumption. What is more, the proof of work as well as the proof of stake requires setting up a minor reward system which is not appropriate to some application contexts.

The elapsed time evidence and/or the elapsed time verification is a topic of high interest to the extent that it is crucial to security and trust in the blockchain technology. Current research on functions so-called verifiable duration functions (or in an equivalent manner verifiable delay or time interval functions) or VFD (Verifiable Delay Functions). These functions involve three algorithms: an algorithm (Setup) for initialising a pair of evaluation ($e_k$) and verification ($v_k$) parameters according to a security level ($\lambda$) and a given duration (T), an algorithm for evaluating a function (Eval) from an input value (x) and the evaluation parameter ($e_k$), the evaluation function given an output value (y) and an evidence ($\pi$) and finally a verification algorithm (Verify) supplying a boolean result from the verification parameter ($v_k$), the input and output values (x,y) and the evidence ($\pi$). The principle of such a duration verification function is that it is not possible to anticipate the value of the parameters $e_k$ and $v_k$ before expiry of the duration T, and that any computing parallelisation to execute the initialisation algorithm more rapidly leads to an evaluation result that cannot be differentiated from a random number.

A presentation of verifiable duration functions could be found in the article by D. Boneh et al. entitled "Verifiable delay functions", published in Advances in Cryptology, CRYPTO 2018, Springer Int'l Publishing, pp. 757-788. Verifiable duration functions may be implemented in different manners.

A first approach consists in building such a function by means of a secure environment or TEE (Trusted Execution Environment). More specifically, such an environment executes the aforementioned evaluation algorithm. It receives the input value x as well as a pair of evaluation and verification parameters ($e_k$,$v_k$), and outputs, on the one hand, a hashed value y of x, by means of a hash function whose complexity depends on the difficulty parameter $\lambda$, and, on the other hand, an evidence $\pi$ obtained as a signature of y by means of the private key of an asymmetric cryptosystem stored in the environment. The environment is synchronised on an external clock to perform the evaluation of the duration T. Nonetheless, this clock is a single point of failure (single point of failure) and could undergo malicious actions likely to corrupt the result of the evaluation.

A second approach consists in sequentially performing drawings of a random number, performing a hashing of the input value x concatenated with the random number thus obtained, namely $x|\alpha$ until a given condition on the hashing result is met, said condition depending on the difficulty degree $\lambda$. The proof of work used in the Bitcoin and Ethereum blockchains, very energy-intensive, is based on this principle. Other evaluation functions based on recursive SNARKs (Succinct Non-Interactive ARguments of Knowledge) (SNARK by SNARK). These involve recursive hash functions using homomorphic encryption techniques, also very energy-intensive.

Finally, a third approach for implementing the evaluation function is to resort to a polynomial construction consisting in sequentially calculating ($\lambda$ times) the square of a hash function in a Galois group. Like the previous one, this approach consists in making substantial calculations that cannot be parallelised and that cannot be optimised, which therefore leads, again, to a significant energy consumption.

The proof of elapsed time (or PoET) algorithm is a consensus mechanism of the Nakamoto type for blockchains with a controlled access (permissioned blockchains) which needs a substantially lower energy consumption that the Bitcoin. The proof of work (PoW) is herein replaced by a lottery system which generates a random wait time for each minor (or validator node) of the chain. To do so, each minor is provided with a trusted environment (TEE) which supplies it with a certified random time during which it should wait before being authorised to submit its next block to the consensus. Any node participating to the chain should be able to verify that the wait time has actually been generated by the certified random drawing in the trusted environment and that this wait time has actually been complied with by the minor.

The PoET algorithm has been successfully deployed in the Hyperledger Sawtooth blockchain. Nonetheless, the trusted environment (SGX) use an external timer located off the trusted execution area (TEE) and could undergo some hardware attacks intended to corrupt the generated wait times.

Consequently, an object of the present invention is to provide a method for generating an evidence on the time elapsed between transactions emitted by a node towards a distributed register (ledger) and, more generally, in an asynchronous network node, which does not have the aforementioned drawbacks, in particular which is relatively simple, energy efficient and robust to hardware attacks.

DISCLOSURE OF THE INVENTION

The present invention is defined by a method for generating an evidence of the time elapsed between successive events occurring in a node of an asynchronous network, said node comprising an embedded system split into a trusted area and an untrusted area, the trusted area comprising a trusted execution environment or TEE in which the integrity and the confidentiality of the code and of the data are ensured, and a trusted hardware component or TPM including a first clock, called control clock giving the time elapsed since its last initialisation and a monotonic counter indicating the number of initialisations of the control clock, the TEE environment being provided with a second clock, called system clock, and receiving on the one hand the control clock of the TPM and on the other hand a third clock, called precision clock, of a peripheral external to the embedded system, the control clock having a higher security degree than the system clock and the precision clock, the precision clock having higher accuracy and stability than those of the control clock and of the system clock, the successive events including at least two events successively occurring in the node, called prior event and posterior event, said method being original in that:

an application in the TEE environment measures the time at which the prior event occurs, the measurement being performed using the first, second and third clocks, to supply first, second and third time measurements relating to the prior event;

said application measures a time at which the posterior event occurs, the measurement being performed using the first, second and third clocks, to supply first, second and third time measurements relating to the posterior event;

said application determines, from the measurements thus obtained respectively for the prior event and for the posterior event, first, second and third measurements of the time elapsed between the prior event and the posterior event;

said application verifies the coherence of the first, second and third clocks by comparing the elapsed time measurements thus obtained and if these do not differ by more than a predetermined tolerance margin, forms an elapsed time evidence message of the time elapsed between the prior event and the posterior event, the elapsed time evidence message comprising the value of the monotonic counter, the time measurements relating to the posterior event and the shifts of the second ($\varepsilon_{TEE}$) and third ($\varepsilon_{GPS}$) clocks with respect to the first clock over the elapsed time interval;

said application signs said message with a private key of the node before transmitting it over the asynchronous network.

Advantageously, the shifts of the control clock and of the system clock with respect to the precision clock are integrated in the time by said application and that, when one of these exceeds a predetermined maximum value, the latter is corrected.

According to the method, each event for which it is possible to determine the time at which the event occurs can be taken into account among the successive events with the meaning of the present disclosure. One of the successive events event can be for instance, in a non-limiting manner, the formation of a transaction by a client node.

One of the successive events may be, for example, the beginning or the end of an operation, or the beginning or the end of the execution of a function; or the fulfillment of a condition (or criterion), etc.

Thus, many events other than the formation of transactions can be taken into account as successive events, such as:

For the prior event:
The finalization of the construction of a block on the blockchain, once all new transactions from a MEMPOOL have been included in the block;
The receipt of a valid block; or
An event from a peer network (such resynchronization can be observed in leader election mechanisms; a global clock is then used to trigger the consensus process);

For the posterior event:
The fulfillment of a condition set by a timer, or the completion of a given calculation, or the obtainment of a solution to a problem, notably a challenge (cryptographic problem); or
Receipt of a valid block or event from the peer network.

The present invention also relates to a method for generating an evidence of the time elapsed between successive transactions emitted by a node, called client node, intended to a distributed register, which implements a method for generating an evidence of the time elapsed between successive events as defined hereinabove, each of the successive events being the formation of a transaction by said client node.

Advantageously, the transaction emitted by the client node further comprises a hash of the code of the application at the time the transaction is formed.

According to one embodiment, the transaction emitted by the client node further comprises the value of a transaction counter, said counter being incremented at each emitted transaction.

The transaction emitted by the client node may further comprise a measurement of the time at which the previous transaction has been emitted, the measurement having been performed by means of the control clock and being signed by a private key of the TPM module.

According to one variant, prior to the emission of the successive transactions, the client node emits a record transaction intended to the distributed register, said record transaction comprising an initial value of the monotonic counter, and indicates the initial values of the control clock, of the system clock and of the precision clock.

The verification may be performed by a third-party node of the asynchronous network, called validator node, for a new transaction emitted by the client node, wherein the validator node extracts from the current transaction the value of the monotonic count and verifies in the distributed register that it is identical to that of the previous transaction, then extracts the shifts of the second and third clocks and compares them with a predetermined tolerance margin to verify the coherence of the clocks of the client node.

Advantageously, prior to the verification of the coherence of the clocks of the client node, the verifier node ensures using the signature of the transaction that the latter has actually been emitted by the client node.

Afterwards, the verifier node extracts from the transaction of the client node the value of the precision clock and compares it with the value of its precision clock upon reception of this transaction, and verifies that the difference of the second one with the first one is greater than zero and shorter than a predetermined maximum propagation time.

Preferably, the verifier node is a node having a reliability degree higher than a predetermined value, the reliability degree of a node increasing with the number of successfully validated transactions and with the time elapsed since recording thereof in the distributed register.

If the verification has been successfully performed, the validator node emits a transaction, called validation transaction, comprising a hash of the validated transaction and the time at which it has been received, measured by the precision clock of the validator node.

The validator node may verify beforehand the coherence of its first, second and third clocks before emitting the validation transaction to the distributed register.

The validation transaction typically comprises the measurements of the time at which the validation is performed by means of the first, second and third clocks, the value of the monotonic counter of the validator node as well as the shifts of the second ($\varepsilon_{TEE}^{val}$) and third ($\varepsilon_{GPS}^{val}$) clock of the validator node with respect to the first clock of the validator node over the time interval elapsed since the last transaction emitted by the validator node.

Advantageously, the validation transaction further comprises a hash of the code executing the verification in the TEE environment of the validator node, at the time the transaction of the client node is validated.

BRIEF DESCRIPTION OF THE DRAWINGS

Other features and advantages of the invention will appear upon reading a preferred embodiment of the invention, made with reference to the appended figures wherein.

DETAILED DISCLOSURE OF PARTICULAR EMBODIMENTS

Next, we consider a network of asynchronous nodes, each node being able to emit messages on the network. By network of asynchronous nodes, we mean that the different nodes of the network are not synchronised by a common clock.

Without departing from generality, we will assume later on that these messages are transactions intended to be recorded in a distributed register (distributed ledger), which may be a transaction graph or a blockchain. The blockchain is formed by the concatenation of transactions temporally ordered and stamped by the nodes that have emitted them.

Figure 1:
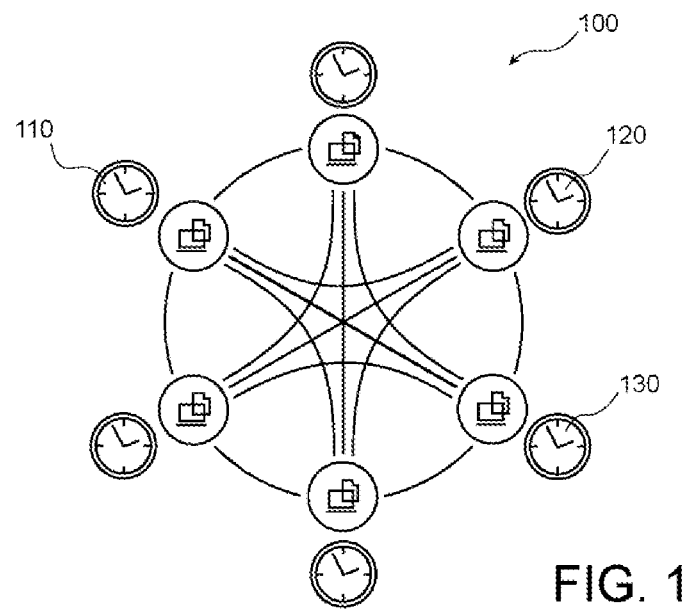
FIG. 1 schematically shows a network of asynchronous nodes illustrating the application context of the present invention.

An asynchronous node network, 100, has been schematically shown in FIG. 1.

It comprises at least one emitter node, 110, capable of generating and emitting a transaction, called client transaction, supplying an evidence of the elapsed time, and at least one validator node, 120, intended to verify the correctness of the evidence thus supplied, the validator node storing the transaction in the distributed register when the evidence is considered to be correct. Afterwards, each node of the network, 130, can read the transaction in the register and verify that this evidence is actually correct.

Figure 2:
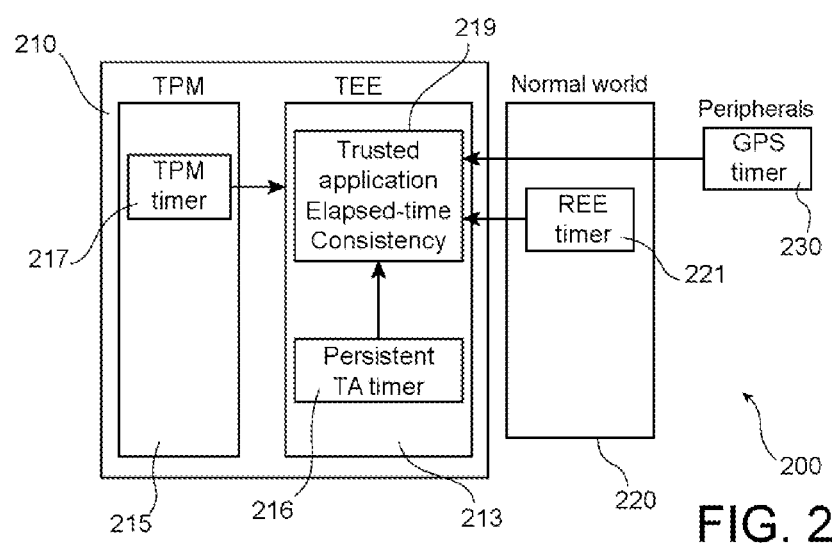
FIG. 2 schematically shows an embedded system in an asynchronous node allowing implementing the method for generating an evidence of the time elapsed between two events according to an embodiment of the present invention.

The generation of an evidence of the elapsed time in the emitter node involves an embedded system including a trusted area, whose architecture is schematically shown in FIG. 2.

The embedded system or SOM (System On Module), 200, may be made in the form of a daughterboard intended to be plugged onto the motherboard of the considered node. The embedded system includes a trusted area 210, itself comprising a trusted execution environment, 213, also called TEE (Trusted Execution Environment) and a trusted hardware component, 215, also called TPM (Trusted Platform Module). The trusted area, 210, is isolated from the untrusted environment area, so-called "normal", 220.

The execution code and the data in the TEE environment are protected against software attacks. More specifically, the confidentiality and the integrity of the execution code and of the data are guaranteed therein. The TEE is provided with a processor and a memory area enabling applications therein to be able to be executed without any risk of corruption. An example of a TEE is SGX™ (Software Guard eXtensions) from the Intel company.

The TPM module, 215, is a passive piece of equipment with no operating system but able to contain secure hardware elements such as a safe deposit to store cryptographic keys, a random number generator, or, like in this case, a counter serving as a secure timer (timer).

Several clocks are available in the embedded system:
- a first clock, Clk_TPM, called control clock, 217, having the highest security level, is supplied by the TPM module. It gives the time elapsed since its last initialisation. This clock may be reinitialised by means of an initialisation command of the TEE. Each time the control clock is initialised, a permanent monotonic counter, called RAZ permanent counter, is incremented. It is essential to note that this RAZ permanent counter can never be reinitialised even by the TEE. The shift of the control clock with respect to a reference clock may further be corrected by an adjustment command of the TEE;
- a second clock, Clk_TEE, is supplied by a permanent counter (persistent TA timer), 221, of the operating system of the TEE environment. The update of this second clock can be done only by accessing to the highest privilege level of the operating system;
- a third clock consists of an external clock with a higher accuracy than that of the first two, Clk_GPS, called reference clock, for example a GPS time supplied by a GPS receiver, 230, from the navigation satellite messages received thereby, is transmitted to the TEE environment of the embedded system. However, it should be noted that this reference clock could be corrupted, either because fake navigation messages (GPS spoofing) are received by the receiver and lead to an erroneous time, or because the external clock undergoes an attack during transport thereof between the GPS receiver and the TEE environment;

an optional fourth clock may be supplied by a module 221 of the operating system of the untrusted environment, 220, of the embedded system (for example a Linux system clock). This clock, Clk_REE, unprotected and able to be modified by the user, is transmitted to the TEE environment.

Figure 3:
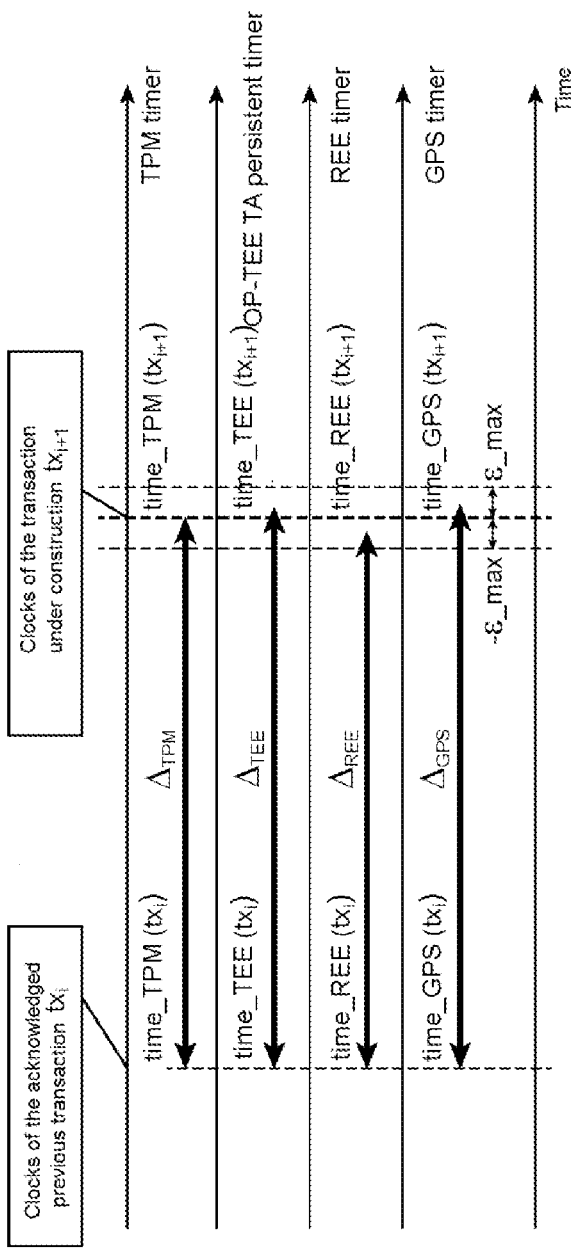
FIG. 3 shows a verification of the coherence of the times measured by different clocks in the embedded system of FIG. 2.

A trusted application (trusted application) intended to be executed within the TEE environment is intended to verify the coherence of the different clocks and to reconcile the measurements of the time elapsed between two events, from these same clocks. More specifically, as illustrated in FIG. 3, the trusted application, 219, hereinafter denoted ETC_app, ensures that the time intervals respectively measured by the reference clock, the second and where appropriate the third clock are actually coherent with the time interval measured by the control clock, in other words that:

[Math. 1]
$$|\Delta_{GPS} - \Delta_{TPM}| < \varepsilon_{max} \quad (1\text{-}1)$$

[Math. 2]
$$|\Delta_{TEE} - \Delta_{TPM}| < \varepsilon_{max} \quad (1\text{-}2)$$

[Math. 3]
$$|\Delta_{REE} - \Delta_{TPM}| < \varepsilon_{max} \quad (1\text{-}3)$$

with:

[Math. 4]
$$\Delta_{TPM} = \text{time\_TPM}(tx_{i+1}) - \text{time\_TPM}(tx_i), \quad (2\text{-}1)$$

[Math. 5]
$$\Delta_{TEE} = \text{time\_TEE}(tx_{i+1}) - \text{time\_TEE}(tx_i), \quad (2\text{-}2)$$

[Math. 6]
$$\Delta_{GPS} = \text{time\_GPS}(tx_{i+1}) - \text{time\_GPS}(tx_i), \quad (2\text{-}3)$$

[Math. 7]
$$\Delta_{REE} = \text{time\_REE}(tx_{i+1}) - \text{time\_REE}(tx_i), \quad (2\text{-}4)$$

and where $\varepsilon_{max}$ is a tolerance margin, $tx_i$ and $tx_{i+1}$ are any two successive events occurring in the node, and observed by the embedded system, for example the time points when two successive transactions are emitted. These events are an example of a prior event and a posterior event with the meaning of the present disclosure.

When the conditions (1-1), (1-2) and, optionally (1-3), are verified, the application ETC_app concludes on the coherence of the measurements of the time elapsed between the successive events and transmits an elapsed time evidence message on the network. This message includes data relating to the posterior event $tx_{i+1}$, the rank of this event, i+1, the time at which this event has occurred, measured by the different clocks of the embedded system, the shifts of the clocks external to the TPM module with respect to the control clock, namely $\varepsilon_{GPS} = \Delta_{GPS} - \Delta_{TPM}$, $\varepsilon_{TEE} = \Delta_{TEE} - \Delta_{TPM}$ and, where appropriate $\varepsilon_{REE} = \Delta_{REE} - \Delta_{TPM}$. It is essential to note that the shifts are herein estimated with respect to the control clock, which is the most certain, and not with respect to the reference clock which is the most accurate and the most stable. However, within the embedded system, as soon as the conditions (1-1) to (1-3) are met, in other words, as soon as the elapsed time measurements are coherent with each other, the clocks of the TPM module, of the TEE environment and of the REE environment are corrected for their shift with respect to the reference clock.

An example of an elapsed time evidence message typically contains a first data field containing the data, D, relating to the posterior event ($tx_{i+1}$); a counter incremented at each new event giving the index (i+1) of the posterior event; a first time field, giving the time at which this event has occurred, measured by the control clock as well as the content of the RAZ permanent counter, namely time_TPM $(tx_{i+1})\|CTRAZ$; a second time field resulting from the concatenation of the time measured by the clock Clk_TEE, and of the shift $\varepsilon_{TEE} = \Delta_{TEE} - \Delta_{TPM}$ over the interval separating the posterior event and the prior event, namely time_TEE$(tx_{i+1})\|\varepsilon_{TEE}$; a third time field resulting from the concatenation of the elapsed time, $\Delta_{GPS}$, measured by the reference clock and of the shift $\varepsilon_{GPS} = \Delta_{GPS} - \Delta_{TPM}$ with respect to the control clock over the same Interval, namely time_GPS$(tx_{i+1})\|\varepsilon_{GPS}$; and finally an optional fourth time field, resulting from the concatenation of the time measured by the clock Clk_REE, and of the shift $\varepsilon_{REE} = \Delta_{REE} - \Delta_{TPM}$, over the same interval, namely time_REE$(tx_{i+1})\|\varepsilon_{REE}$.

Advantageously, the message may also include an additional field containing a hashed value of the code of the trusted application, ETC_app, by means of a hash function. The considered code is that one which is stored in the TEE environment at the time the application ETC_app performs the coherence verification.

Finally, it may comprise the time at which the prior event has occurred measured by the control clock, namely time_TPM($tx_i$), stored in a memory of the TEE environment. This value allows ensuring the time sequence of the events that have occurred within the emitter node.

Afterwards, the message is signed by means of the private key of the emitter node and before being transmitted on the network.

A third-party node, called validator node, receiving an elapsed time evidence message could at first verify by means of the public key of the node that the elapsed time has actually been measured by the emitter node. Afterwards, it could ensure the coherence of the clocks of the emitter node during the measurement. To do so, it ensures at first that the value of the counter CTRAZ has not changed since the prior event, verifies that the conditions (1-1), (1-2) and, where appropriate, (1-3) are actually met by comparing the absolute values $|\varepsilon_{GPS}|$, $|\varepsilon_{TEE}|$ and, where appropriate, $|\varepsilon_{REE}|$, tolerance margin, $\varepsilon_{max}$. If these absolute value are lower than the tolerance margin, the validator node concludes on the coherence of the clocks.

Finally, it could rebuild the history of the events within the emitter node with the correct time intervals between the successive events. The time intervals are given with the accuracy of the reference clock, Clk_GPS, and the reliability of the control clock, Clk_TPM, of the emitter node.

Figure 4:
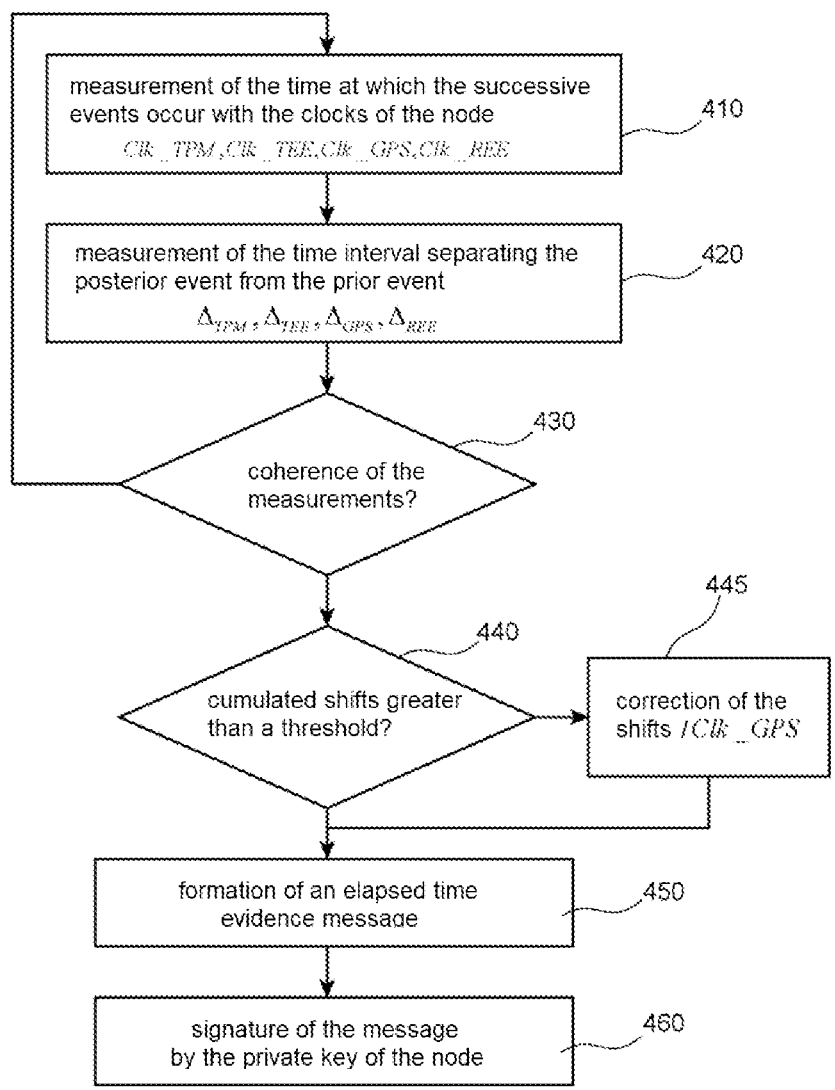
FIG. 4 shows a flowchart of a method for generating an evidence of the time elapsed between successive events within a node, according to a general embodiment of the present invention.

FIG. 4 summarises in the form of a flowchart a method for generating an evidence of the time elapsed between successive events within a node, according to a general embodiment of the present invention.

The same conditions as before are considered, the embedded system of the node is provided with at least one first clock, called control clock, within a TPM module, a second clock provided by the operating system of the TEE environment, called system clock, and a third clock, external and unprotected, with an accuracy substantially higher than the first and second clocks and, for this reason called precision clock.

In a first step 410, the embedded system of the node measures the time, or more precisely, the successive time points, at which the successive events occur in the node, or observed events. These time points are measured with the first, second and third clocks.

One considers here specifically the functioning of the embedded system in response to the two events cited above, that is, the prior event $tx_i$ and the posterior event $tx_{i+1}$.

At step S410, the embedded system measures using the first, second and third clocks the time point at which the prior event $tx_i$ occurs. It then measures, again using the first, second and third clocks, the time point at which the posterior event $tx_{i+1}$ occurs.

In step 420, a trusted application in the TEE area verifies the coherence of the clocks from the measurements obtained for the posterior event, time_TPM($tx_{i+1}$), time_TEE($tx_{i+1}$), and time_GPS($tx_{i+1}$). To this end, the application measures the time interval elapsed between the posterior event and the prior event, by difference with the measurements performed for the prior event, time_TPM($tx_i$), time_TEE($tx_i$), and time_GPS($tx_i$), also stored in the TEE area, namely $\Delta_{TPM}$, $\Delta_{TEE}$, $\Delta_{GPS}$. More specifically, the trusted application verifies that the elapsed time interval measurements do not differ by more than a predetermined tolerance margin, in other words that the shifts of the second and third clocks with respect to the first one over the interval separating two successive events, are less than a tolerance margin.

If so, it is concluded on the coherence of the clocks and the methods is carried on in step 440.

If not, the measurement is not reliable or an attack has taken place and we return back to step 410 for the observation of the next event. Alternatively, or after several failures, it is declared that the embedded system is defective.

In step 440, if the cumulative shift over time exceeds a predetermined maximum value, the shifts are corrected in 445 based on the precision clock.

In step 450, the embedded system forms an elapsed time evidence message as described before. In particular, the message comprises an event counter, the RAZ permanent counter, the time at which said event has occurred, as measured by means of the different clocks, namely time_TPM($tx_{i+1}$), time_TPM($tx_{i+1}$), time_TEE($tx_{i+1}$), and time_GPS($tx_{i+1}$) and the shifts of the second and third clocks with respect to the control clock, $\varepsilon_{TEE}$, $\varepsilon_{GPS}$. The message may further contain the hash of the code of the trusted application, ETC_app and/or the hash of the time at which the prior event has occurred.

In step 460, the embedded system signs the message by means of the secret key of the node and transmits the message thus signed over the network.

This evidence generation method enables a third-party node of the network to verify that the time elapsed between two successive events of the emitter node is actually correct. For example, it could be applied to prove the time points at which a sensor performs measurements in a IoT network or, as described hereinafter in a consensus mechanism to validate one or more transaction(s) to be added to the distributed register (ledger).

Figure 5:
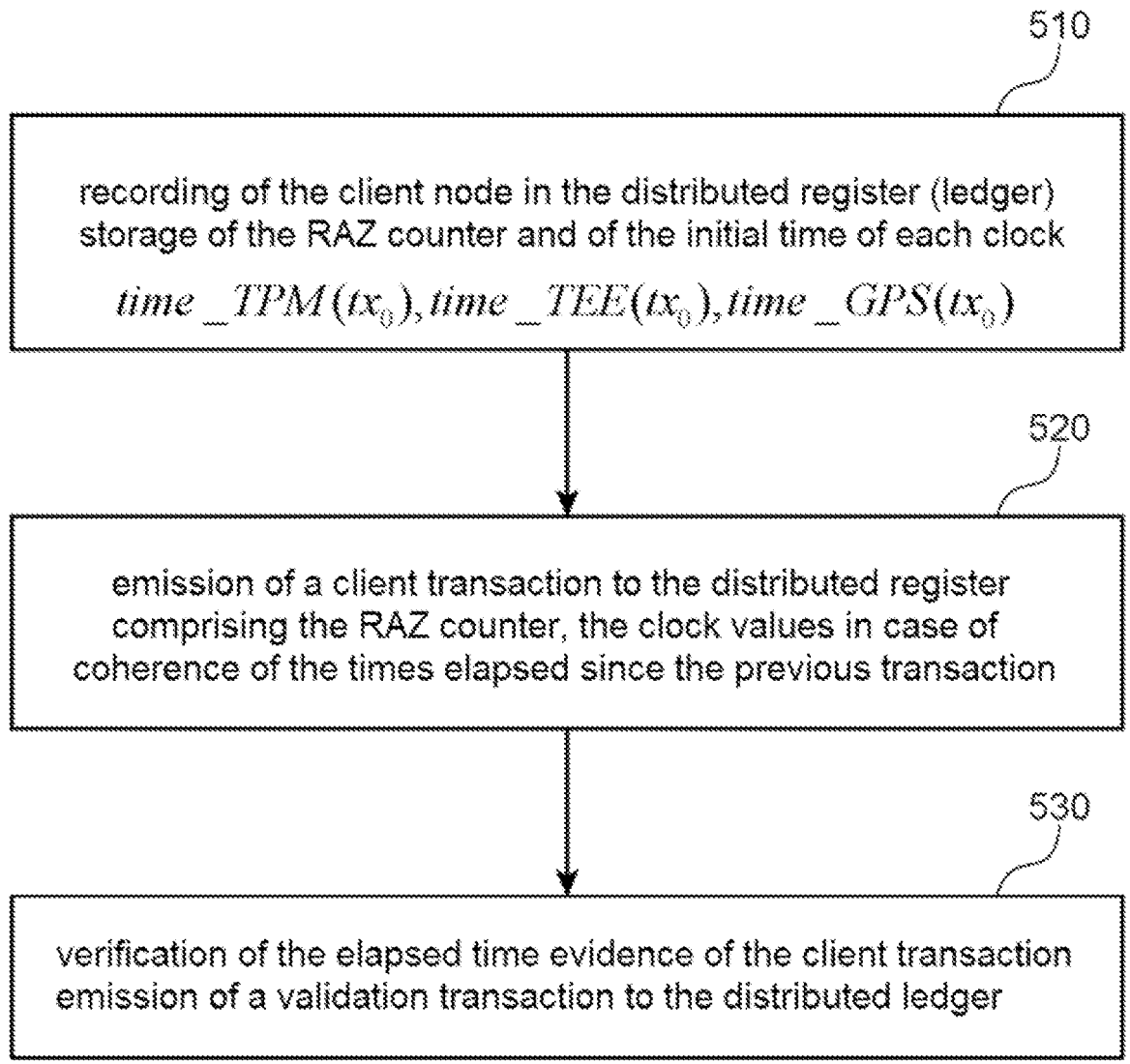
FIG. 5 shows a method for verifying the time elapsed between successive transactions emitted by a node in a distributed register.

FIG. 5 shows a method for verifying the time elapsed between successive transactions emitted by a node intended to a distributed register.

It will be assumed that the used distributed register technology allows deploying smart contracts, also called autonomous contracts or "smart contracts". An example of such a technology is Ethereum. As a remainder, a smart contract is a program which is deployed (i.e. Stored) in a distributed register (ledger) and can be executed by any node of the network.

The verification method described hereinafter enables a verifier node to verify the time elapsed between two successive transactions emitted by an emitter node, also called client, towards a distributed register. The emitter node comprises an embedded system (SOM) as described before with reference to FIG. 2.

It comprises a prior recording phase (enrolment), 510, during which the emitter node transmits a transaction to a first smart contract, SC_REC. This recording phase, described in details later on, enables the node to authenticate with regards to the pairs of the network and to store in the chain the initial hour of each of the first, second and third clocks, time_TPM($tx_0$), time_TEE($tx_0$), time_GPS($tx_0$) read in the TEE environment of its embedded system.

Following this record, the emitter node can emit, in 520, transactions, called "client" transactions, including, on the one hand, a payload to be recorded in the distributed register (ledger) and, on the other hand, an evidence of the time elapsed since the emission of the last transaction. This transaction may be considered as a particular case of a message generated according to the evidence generation method described before with reference to FIG. 5.

Consequently, this client transaction comprises the RAZ permanent counter, the times supplied by the different internal clocks, Clk_TPM, Clk_TEE, Clk_GPS, where appropriate, Clk_REE, as well as their respective shifts with respect to the control clock.

The client transaction may further contain the hashed value of the code of the trusted application, _app, and/or that of the time, time_TPM($tx_i$), at which the client node has emitted the previous transaction.

The coherence of the times supplied by each of the clocks is verified by the emitter node before it emits a client transaction intended to the distributed register (ledger).

Afterwards, any third-party node of the network can verify that the time elapsed between two successive transactions of the client node is actually correct. To do so, it verifies at first that the RAZ permanent counter has not varied, then verifies that the measurements of the time elapsed between the current transaction and the previous transaction, by means of the different internal clocks, namely $\Delta_{TPM}$, $\Delta_{TEE}$, $\Delta_{GPS}$ do not differ by more than a tolerance margin $\varepsilon_{max}$. Alternatively or complementarily, it can extract the times time_TPM($tx_{i+1}$), time_TEE($tx_{i+1}$), time_GPS($tx_{i+1}$), (where appropriate time_REE($tx_{i+1}$)) of the current transaction, and read in the distributed register (ledger) the times time_TPM($tx_i$), time_TEE($tx_i$), time_GPS($tx_i$), (time_REE($tx_i$), of the previous transaction and deduce the measurements of the time elapsed between the transactions, by the different clocks, namely $\Delta_{TEE}$, $\Delta_{GPS}$, (and, where appropriate, $\Delta_{REE}$). The differences between the elapsed time measurements should not be greater than the tolerance margin $\varepsilon_{max}$.

Some so-called validator nodes (serving as minors) could certify that they have successfully performed such a verification and record this certificate in the distributed register (ledger) by means of a transaction, called validation transaction, transmitted to the smart contract SC_REC.

Before emitting such a transaction in 520, a validator node should be recorded beforehand according to the record procedure described hereinabove and have a sufficient reputation rating, as detailed later on. The validation transaction certifies that the validator node has performed a verification of the evidence of the time elapsed between two successive transactions of a client node. Before proceeding with the verification of the coherence of the measurements of the time elapsed between successive client transactions, the validator node ensures by itself the coherence of its own clocks.

The validation transaction is specific in that it comprises in its payload the hashed value of the client transaction which has been verified by means of a hash function as well as the reference time at which this client transaction has been verified.

It further comprises, according to the same format as the client transaction: a counter incremented at each new transaction emitted by the validator node herein giving the index (j+1) of the validation transaction; a first time field, giving the time at which the validation has occurred, measured by the control clock of the validator node as well as the content of the RAZ permanent counter of this node, namely time_$TPM^{val}(tx_{j+1})\|CTRAZ^{val}$ (the upper index "val" indicates that the value relates to the validator node); a second time field resulting from the concatenation of the time elapsed between the transactions j (not necessarily a validation transaction) and j+1, as measured by the clock Clk_$TEE^{val}$, with the shift $\varepsilon_{TEE}^{val}=\Delta_{TEE}^{val}-\Delta_{TPM}^{val}$ over the interval separating the validation transaction and the previous transaction of the validator node, namely time_$TEE^{val}(tx_{j+1})\|\varepsilon_{TEE}^{val}$; a third time field resulting from the concatenation of the elapsed time, $\Delta_{GPS}^{val}$, as measured by the reference clock of the validator node and of the shift $\varepsilon_{GPS}^{val}=\Delta_{GPS}^{val}-\Delta_{TPM}^{val}$ with respect to the control clock of the validator node, namely time_$GPS^{val}(tx_{j+1})\|\varepsilon_{GPS}^{val}$; and finally an optional fourth time field, resulting from the concatenation of the elapsed time, measured by the clock Clk_$REE^{val}$, and of the shift $\varepsilon_{REE}^{val}=\Delta_{REE}^{val}-\Delta_{TPM}^{val}$, over the same interval, namely time_$REE^{val}(tx_{j+1})\|\varepsilon_{REE}^{val}$.

The validation transaction may further contain the hashed value of the code of the trusted application, $ETC^{val}$_app, and/or that of the time, time_$TPM^{val}(tx_{j+1})$, at which the previous transaction has been emitted.

Before validating a client transaction, the validator node could ensure that the reference time at which it proceeds with the validation is greater than the reference time contained in the client transaction but does not exceed the latter by a maximum propagation time in the network, in other words that:

[Math. 8]

$$0<(\text{time\_GPS}^{val}(tx_{j+1})-\text{time\_GPS}(tx_{j+1}))\leq\tau \qquad (3)$$

where $\tau$ is a maximum propagation time in the network.

A node of the network may be assigned a trust/reputation rating according to the number N of validated transactions it has emitted and the time elapsed $\Delta$ since recording thereof in the chain. The greater the number N and the longer the duration $\Delta$, the more reliable the node will be considered. When the trust/reputation rating of a node is high enough, it could be authorised to become a validator node. The rating threshold required to be a validator node may increase over time, so as to control the total number of verifier nodes in the chain.

Figure 6A:
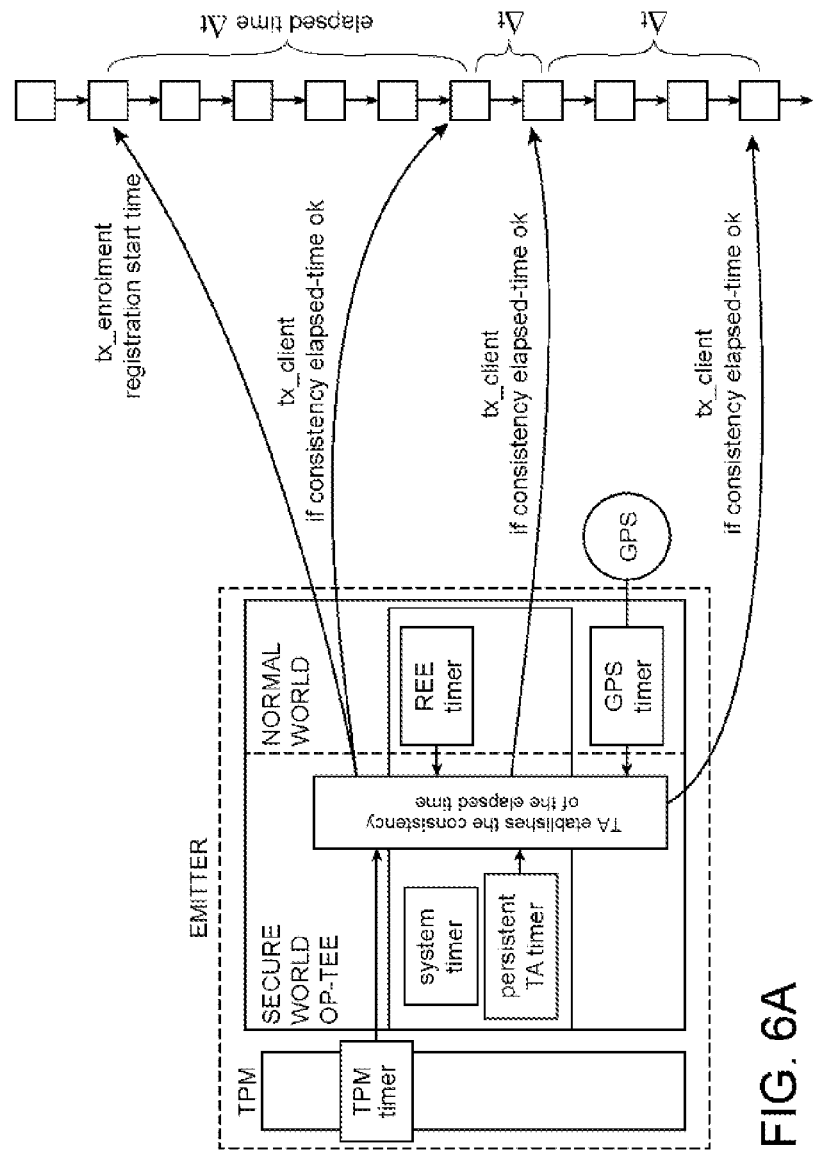
FIG. 6A schematically shows a step of recording a client node in the implementation of the verification method of FIG. 5.

FIG. 6A illustrates the step of recording a client node, 510, in the method for verifying the time elapsed between successive transactions of FIG. 5.

The record transaction (referred to as x_enrolment in the figure) of the node is emitted at a given time point denoted "registration start time" and recorded in the distributed register (ledger) after having been validated. It comprises the initial values of the first, second and third clocks, time_TPM $(tx_0)$, time_TEE$(tx_0)$, time_GPS$(tx_0)$, the value of the RAZ counter (this counter may have no zero value upon recording). It may further comprise the hash of the trusted application, ETC_app, as well as the time (measured by the TPM clock) at which the previous transaction has been emitted by the client node. The record transaction is signed by means of the private key of the considered node.

This transaction is transmitted to the record smart contract, SC_REC. Afterwards, it may be validated by a validator node, the validation thus being simplified because the verification of the coherence of the measurements of the time elapsed since the previous transaction is herein omitted.

Once the node is recorded in the distributed register (ledger), the latter can emit client transactions (denoted tx_client) to the smart contract SC_REC, provided that it has verified the coherence of its clocks as described before. Each transaction comprises an evidence of the time elapsed between the emitted transaction and the previous transaction.

Figure 6B:
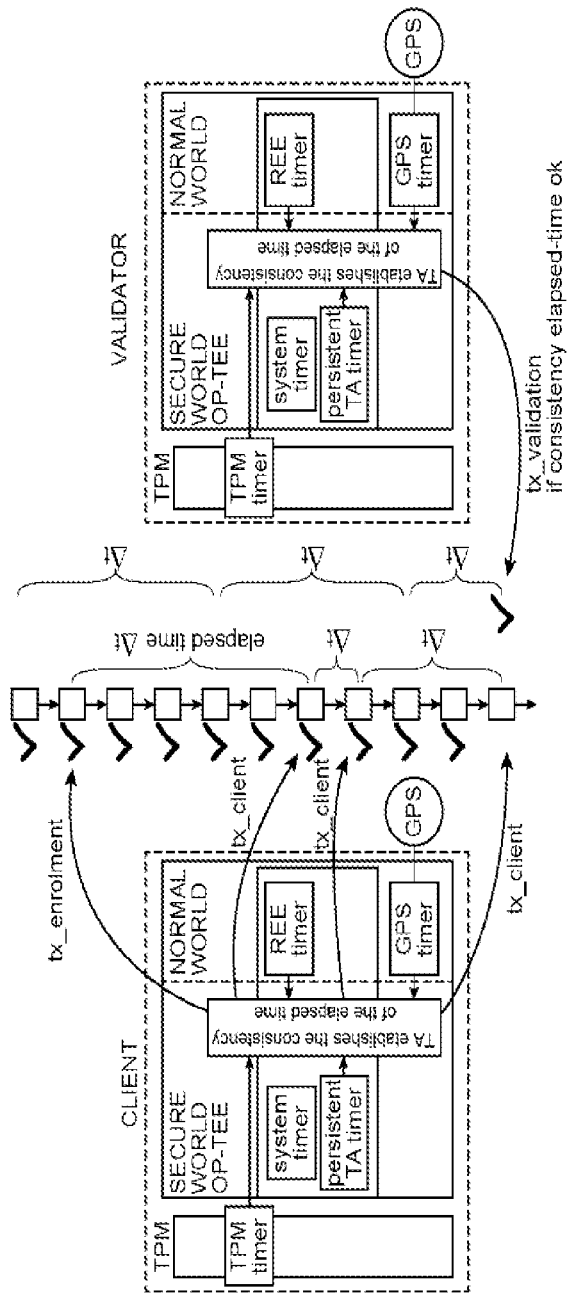
FIG. 6B schematically shows a step of validating the time elapsed between two successive transactions emitted by a client node.

FIG. 6B schematically shows a step of validating the time elapsed between two successive transactions emitted by a client node. The successive transactions of the same node are authenticated by means of their signature.

A validator node may verify the coherence of the measurements of the time elapsed between successive transactions. The validator node ensures at first that the value of the RAZ counter has not varied between the two transactions (no reinitialisation of the control clock), reads in the transactions the values of the different internal clocks present in the current transaction, reads in the distributed register (ledger) the values of the internal clocks present in the previous transaction recorded in the distributed register (ledger), and deduces the measurements of the time elapsed between these two transactions by means of the different clocks, namely $\Delta_{TPM}$, $\Delta_{GPS}$, $\Delta_{TEE}$, and optionally $\Delta_{REE}$, and ensures their coherence within a given tolerance margin. If these measurements are coherent, the validator node transmits to the smart contract a validation transaction, after having ensured the coherence of its own clocks. The client transaction is recorded in the distributed register (ledger) when it is validated by a predetermined number of validator nodes. The record may be performed on a block basis, after a predetermined number of client transactions have been validated.

The invention claimed is:

1. A method for generating an evidence of the time elapsed between successive events occurring in a node of an asynchronous network, said node comprising an embedded system split into a trusted area and an untrusted area, the trusted area comprising a trusted execution environment or TEE in which the integrity and the confidentiality of the code and of the data are ensured, and a trusted hardware component or TPM including a first clock, called control clock giving the time elapsed since its last initialisation and a monotonic counter indicating the number of initialisations of the control clock, the TEE environment being provided with a second clock, called system clock, and receiving on the one hand the control clock of the TPM and on the other hand a third clock, called precision clock, of a peripheral external to the embedded system, the control clock having a higher security degree than the system clock and the precision clock, the precision clock having higher accuracy and stability than those of the control clock and of the system clock, the successive events including at least two events successively occurring in the node, called prior event and posterior event, wherein:

an application in the TEE environment measures the time at which the prior event occurs, the measurement being performed using the first, second and third clocks, to supply first, second and third time measurements relating to the prior event;

said application measures a time at which the posterior event occurs, the measurement being performed using the first, the second and the third clock, to supply first, second and third time measurements relating to the posterior event;

said application determines, from the measurements thus obtained respectively for the prior event and for the posterior event, first, second and third measurements of the time elapsed between said prior event and said posterior event;

said application verifies the coherence of the first, second and third clocks by comparing the elapsed time measurements thus obtained and if they do not differ by more than a predetermined tolerance margin, forms an elapsed time evidence message of the time elapsed between the prior event and the posterior event, the elapsed time evidence message comprising the value of the monotonic counter, the time measurements relating to the observed event and the shifts of the second and third clocks with respect to the first clock over the elapsed time Interval;

said application signs said message with a private key of the node before transmitting it over the asynchronous network.

2. The method for generating an evidence of the time elapsed between successive events according to claim 1, wherein the shifts of the control clock and of the system clock with respect to the precision clock are integrated in the time by said application and that, when one of these exceeds a predetermined maximum value, the latter is corrected.

3. A method for generating an evidence of the time elapsed between successive transactions emitted by a node, called client node, intended to a distributed register, wherein it implements a method for generating an evidence of the time elapsed between successive events according to claim 1, each of the successive events being the formation of a transaction by said client node.

4. The method for generating an evidence of the time elapsed between successive transactions according to claim 3, wherein the transaction emitted by the client node further comprises a hash of the code of the application at the time the transaction is formed.

5. The method for generating an evidence of the time elapsed between successive transactions according to claim 3, wherein the transaction emitted by the client node further comprises the value of a transaction counter, said counter being incremented at each emitted transaction.

6. The method for generating an evidence of the time elapsed between successive transactions according to claim 3, wherein the transaction emitted by the client node further comprises a measurement of the time at which the previous transaction has been emitted, the measurement having been performed by means of the control clock and being signed by a private key of the TPM module.

7. The method for generating an evidence of the time elapsed between successive transactions according to claim 3, wherein, prior to the emission of the successive transactions, the client node emits a record transaction intended to the distributed register, said record transaction comprising an initial value of the monotonic counter, and indicates the initial values of the control clock, of the system clock and of the precision clock.

8. A method for verifying the time elapsed between successive transactions emitted by a client node implementing the method for generating an evidence of the elapsed time according to claim 3, the verification being performed by a third-party node of the asynchronous network, called validator node, for a new transaction emitted by the client node, said method being wherein the validator node extracts from the current transaction the value of the monotonic count and verifies in the distributed register that it is identical to that of the previous transaction, then extracts the shifts of the second and third clocks and compares them with a predetermined tolerance margin to verify the coherence of the clocks of the client node.

9. The method for verifying the time elapsed between successive transactions emitted by a client node according to claim 8, wherein, prior to the verification of the coherence of the clocks of the client node, the verifier node ensures using the signature of the transaction that the latter has actually been emitted by the client node.

10. The method for verifying the time elapsed between successive transactions emitted by a client node according to claim 8, wherein the verifier node extracts from the transaction of the client node the value of the precision clock and compares it with the value of its precision clock upon reception of this transaction, and verifies that the difference of the second one with the first one is greater than zero and shorter than a predetermined maximum propagation time.

11. The method for verifying the time elapsed between successive transactions emitted by a client node according to one of claim 8, wherein the verifier node is a node having a reliability degree higher than a predetermined value, the reliability degree of a node increasing with the number of successfully validated transactions and with the time elapsed since recording thereof in the distributed register.

12. The method for verifying the time elapsed between successive transactions emitted by a client node according to one of claim 8, wherein, if the verification has been successfully performed, the validator node emits a transaction, called validation transaction, comprising a hash of the validated transaction and the time at which it has been received, measured by the precision clock of the validator node.

13. The method for verifying the time elapsed between successive transactions emitted by a client node according to claim 12, wherein the validator node verifies beforehand the coherence of its first, second and third clocks before emitting the validation transaction towards the distributed register.

14. The method for verifying the time elapsed between successive transactions emitted by a client node according to claim 13, wherein the validation transaction comprises the measurements of the time at which the validation is performed by means of the first, second and third clocks, the value of the monotonic counter of the validator node as well as the shifts of the second and third clock of the validator node with respect to the first clock of the validator node over the time interval elapsed since the last transaction emitted by the validator node.

15. The method for verifying the time elapsed between successive transactions emitted by a client node according to claim 14, wherein the validation transaction further comprises a hash of the code executing the verification in the TEE environment of the validator node, at the time the transaction of the client node is validated.

\* \* \* \* \*